US012061708B1

(12) United States Patent
Mritunjai et al.

(10) Patent No.: US 12,061,708 B1
(45) Date of Patent: Aug. 13, 2024

(54) REMOTE TRACKING AND IDENTIFICATION OF KEY ACCESS PATTERNS FOR DATABASES

(71) Applicant: Amazon Technologies, Inc., Seattle, WA (US)

(72) Inventors: Akhilesh Mritunjai, Seattle, WA (US); Wan Man Ryan Chan, Seattle, WA (US); Yogesh Kansal, Bellevue, WA (US); Tushar Rakheja, Seattle, WA (US); Jason Kroll, Seattle, WA (US); Xi Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 533 days.

(21) Appl. No.: 16/586,073

(22) Filed: Sep. 27, 2019

(51) Int. Cl.
*G06F 21/60* (2013.01)
*G06F 3/06* (2006.01)
*G06F 16/22* (2019.01)
*G06F 21/57* (2013.01)
*G06F 21/62* (2013.01)

(52) U.S. Cl.
CPC .......... *G06F 21/604* (2013.01); *G06F 3/0631* (2013.01); *G06F 3/0638* (2013.01); *G06F 16/2255* (2019.01); *G06F 16/2272* (2019.01); *G06F 21/57* (2013.01); *G06F 21/6227* (2013.01)

(58) Field of Classification Search
CPC ............... G06F 21/604; G06F 16/2272; G06F 16/2255; G06F 3/0631; G06F 3/0638; G06F 21/57; G06F 21/6227
See application file for complete search history.

(56) References Cited

U.S. PATENT DOCUMENTS

| | | | | |
|---|---|---|---|---|
| 5,806,058 A | * | 9/1998 | Mori | G06F 16/2272 |
| 6,832,227 B2 | * | 12/2004 | Seki | G06F 16/2282 707/999.2 |
| 6,873,982 B1 | * | 3/2005 | Bates | G06F 16/951 707/999.005 |
| 6,941,432 B2 | * | 9/2005 | Ronstrom | G06F 12/122 711/E12.071 |
| 7,536,713 B1 | * | 5/2009 | Bartholomew | G06F 16/683 380/231 |

(Continued)

*Primary Examiner* — Irete F Ehichioya
*Assistant Examiner* — Huen Wong
(74) *Attorney, Agent, or Firm* — Robert C. Kowert; Kowert, Hood, Munyon, Rankin & Goetzel, P.C.

(57) ABSTRACT

Various embodiments are described for tracking and enabling access to information about key access patterns for database tables managed by a database service of a service provider network. Storage nodes can store data as key-value pairs (or key-document pairs), where the records or documents of a database are addressed by a unique key for each record. The storage nodes over time receive requests to perform various operations (for example, to get, put, update, or delete data in a table) associated with records stored by the storage nodes. Key access information extractors collect information regarding the keys accessed and send the information to a key tracking service. Key tracker nodes of the service can collect the data and send it to aggregator nodes. The aggregator nodes can determine a frequency with which such requests are received for keys of a partition or table to which the aggregator node is assigned.

20 Claims, 11 Drawing Sheets

(56) References Cited

U.S. PATENT DOCUMENTS

| | | | | |
|---|---|---|---|---|
| 8,074,011 | B2* | 12/2011 | Flynn | G06F 9/52 |
| | | | | 711/202 |
| 8,316,237 | B1 | 11/2012 | Felsher et al. | |
| 8,386,540 | B1* | 2/2013 | McAlister | G06F 16/256 |
| | | | | 707/899 |
| 8,768,927 | B2* | 7/2014 | Yoon | G06F 16/22 |
| | | | | 707/737 |
| 8,805,810 | B2 | 8/2014 | Lucas | |
| 9,077,758 | B1* | 7/2015 | McGovern | H04L 63/14 |
| 9,298,604 | B2 | 3/2016 | Sengupta et al. | |
| 9,384,227 | B1* | 7/2016 | Xiao | G06F 16/278 |
| 9,436,689 | B2 | 9/2016 | Pereira et al. | |
| 9,600,500 | B1 | 3/2017 | Gupta et al. | |
| 9,858,781 | B1 | 1/2018 | Campero et al. | |
| 10,268,726 | B1* | 4/2019 | Schiesser | G06F 16/22 |
| 11,061,930 | B1* | 7/2021 | Golding | G06F 3/0611 |
| 11,068,461 | B1* | 7/2021 | Chan | G06F 16/26 |
| 2001/0013028 | A1* | 8/2001 | Arai | G06F 16/2471 |
| 2003/0070094 | A1* | 4/2003 | Gomes | H04L 63/0281 |
| | | | | 340/5.1 |
| 2003/0187852 | A1* | 10/2003 | Abe | H04L 9/40 |
| 2004/0267800 | A1* | 12/2004 | Gupta | G06F 16/282 |
| | | | | 707/999.102 |
| 2008/0059718 | A1* | 3/2008 | Tajima | G06F 3/0689 |
| | | | | 711/148 |
| 2008/0091690 | A1* | 4/2008 | Ellersick | G06F 8/10 |
| 2008/0133456 | A1* | 6/2008 | Richards | G06F 16/2455 |
| 2008/0148051 | A1* | 6/2008 | Ozaki | H04L 9/3263 |
| | | | | 713/168 |
| 2008/0172663 | A1* | 7/2008 | Lee | H04L 51/58 |
| | | | | 717/173 |
| 2009/0144732 | A1* | 6/2009 | Tanaka | G06F 3/0631 |
| | | | | 718/1 |
| 2009/0182887 | A1* | 7/2009 | Zhang | H04L 12/1863 |
| | | | | 709/231 |
| 2011/0191770 | A1* | 8/2011 | Inoue | G06F 9/445 |
| | | | | 717/178 |
| 2011/0214117 | A1* | 9/2011 | Hattori | G06F 8/38 |
| | | | | 717/173 |
| 2013/0191631 | A1* | 7/2013 | Ylonen | H04L 63/1483 |
| | | | | 713/153 |
| 2013/0208651 | A1* | 8/2013 | Fujita | H04W 88/04 |
| | | | | 370/315 |
| 2013/0263206 | A1* | 10/2013 | Nefedov | G06F 21/604 |
| | | | | 726/1 |
| 2013/0332465 | A1* | 12/2013 | Sasaki | G06F 16/2272 |
| | | | | 707/741 |
| 2013/0332608 | A1* | 12/2013 | Shiga | G06F 9/5088 |
| | | | | 709/226 |
| 2014/0115120 | A1* | 4/2014 | Li | H04L 67/1006 |
| | | | | 709/219 |
| 2015/0269383 | A1* | 9/2015 | Lang | G06F 21/604 |
| | | | | 726/1 |
| 2015/0278330 | A1* | 10/2015 | Hawa | H04L 67/06 |
| | | | | 709/203 |
| 2015/0309999 | A1* | 10/2015 | Ng | G06F 16/278 |
| | | | | 707/809 |
| 2016/0378819 | A1 | 12/2016 | Bishop et al. | |
| 2017/0004110 | A1* | 1/2017 | Bhattacharjee | G06F 16/217 |
| 2017/0060744 | A1* | 3/2017 | Saitou | G06F 3/0647 |
| 2017/0155627 | A1* | 6/2017 | Goel | H04L 63/0428 |
| 2017/0192705 | A1* | 7/2017 | Grube | G06F 11/3034 |
| 2017/0270149 | A1* | 9/2017 | Grosman | G06F 16/2228 |
| 2018/0253468 | A1* | 9/2018 | Gurajada | G06F 16/2255 |
| 2018/0373771 | A1 | 12/2018 | Ashwood-Smith | |
| 2020/0065022 | A1* | 2/2020 | Itagaki | G06F 16/13 |

* cited by examiner

REMOTE TRACKING AND IDENTIFICATION OF KEY ACCESS PATTERNS FOR DATABASES

BACKGROUND

Relational databases, which model data as rows and columns in a series of tables, have long been a dominant form of data organization and storage. Various types of non-relational databases have also become increasingly popular in recent decades. One type of database is based on key-value data structures, where data is represented as a collection of key-value pairs such that each possible key appears at most once in a data collection. Records in such databases are then stored and retrieved using the keys that uniquely identify each record, where a record can in turn include various types of fields and associated data. Another similar database structure is a document store, where each "document" stored in the database encapsulates and encodes data and is similarly addressed in the database via a unique key. For many types of applications and use cases, the characteristics of such databases can greatly improve scalability and provide superior performance.

A service provider network can provide a database service that enables users of the provider network to readily create and use databases, where many of the associated tasks of hardware provisioning, database setup and configuration, throughput capacity planning, replication, and scaling can be managed in part or in whole by the service. Users can access their databases using various interfaces provided by the database service, for example, to create new tables, to modify table configurations, to put, get, update, and delete items stored in tables, and so forth.

BRIEF DESCRIPTION OF THE DRAWINGS

Various embodiments in accordance with the present disclosure will be described with reference to the drawings, in which.

Figure 1:
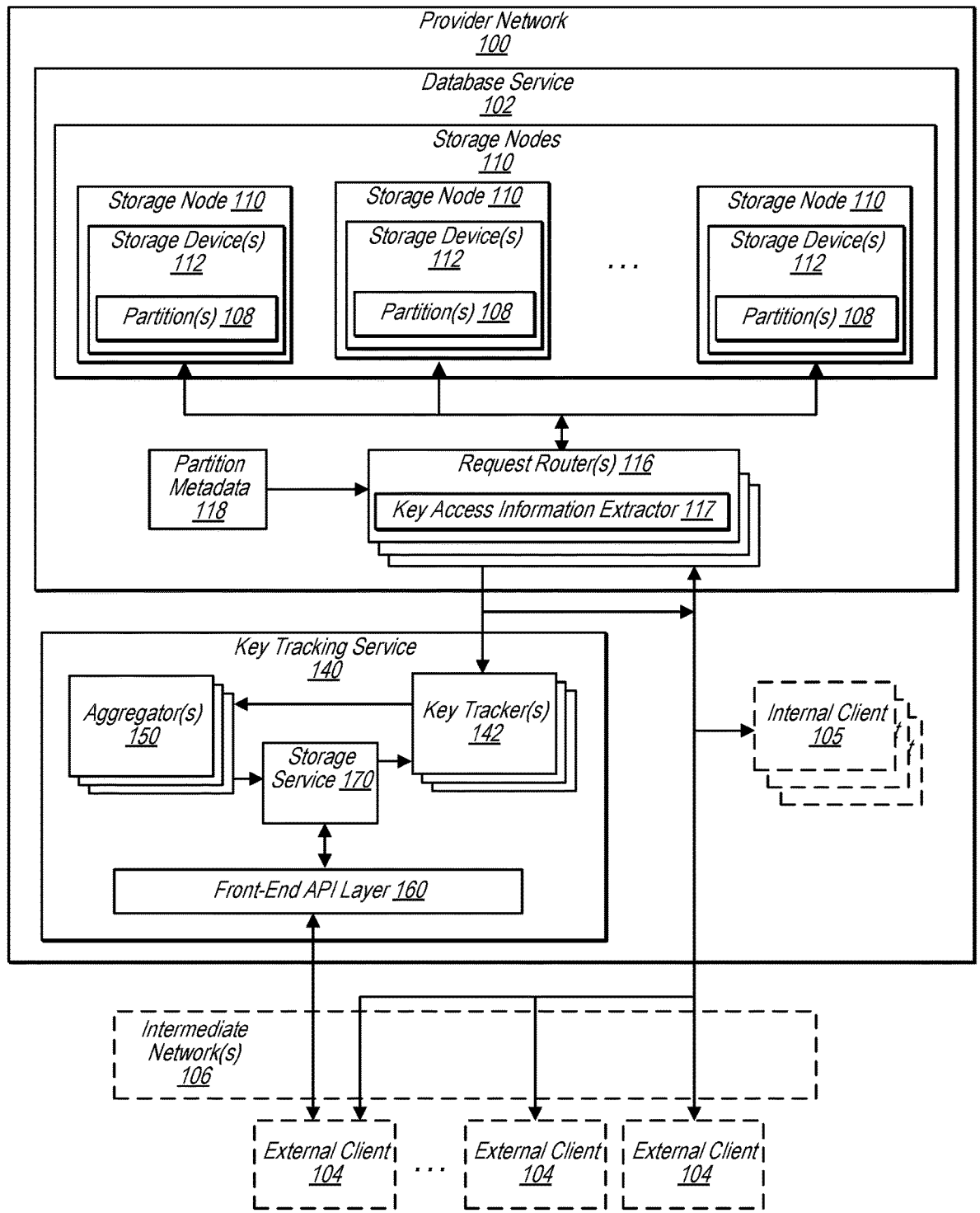
FIG. 1 is a diagram illustrating an environment for remote tracking and identification of keys for databases, including a database service and a key tracking service according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of apparatuses and methods for remote tracking and identification of key access patterns in database systems are described. Methods, apparatus, systems, and non-transitory computer-readable storage media are described for monitoring and enabling user access to information about key access patterns for databases managed by a database service of a service provider network. Embodiments can remotely track access patterns for a database service. In this context, "remotely" can refer to anywhere outside an actual data storage layer that holds database records and serves data plane APIs through accessing disk drives on storage nodes. In traditional database systems, system administrators and database users have a need for discovering what are the most accessed keys in a particular partition or a particular table.

Distributed database systems operate by writing data onto a storage device, or multiple storage devices, at some point after data is written to the database at a given location. According to some embodiments, storage nodes of a database service store data as key-value pairs (or key-document pairs), where the records or documents of a database are addressed by a unique key for each record. The storage nodes over time receive requests to perform various operations (for example, to get, put, update, or delete data in a table) associated with records stored by the storage nodes. However, data on a storage device can only be accessed a limited number of times a second, or read from a limited number of times a second. For example, if storage nodes of a database service support a maximum key access frequency of 1,000 requests per second, then a storage node receiving more than 1,000 requests per second for any given key may generate throttling exception errors until the maximum threshold is no longer exceeded.

In some embodiments, a database service imposes various limits on the frequency with which various types of operations can be performed on data stored in database tables. One such example limit may include a maximum frequency with which operations can be performed on a table as a whole. Another such limit may include a maximum frequency with which any key in a table can be accessed (for example, a database service may impose a limit of 2,000 requests per second for any given key, or any other similar limit depending on the implementation). In this example, if requests specifying a particular key are received with a frequency that exceeds the imposed limit, the database service may return an error message (for example, a throttling exception) for any additional requests until the frequency limit is no longer exceeded.

If a client tries to read or write the same piece of information too many times a second, for example, the storage device physically cannot perform those operations at that frequency. Clients with a "hot key," such as a piece of data in a database table that is written or read from very frequently, can have their access requests throttled. The storage device physically can't access the "hot key" the requested number of times a second, and therefore access requests to the "hot key" become delayed. The "hot key" is a physical limit and is not something where clever software is going to solve the problem.

As indicated above, if a client device sends a request that is received by a storage node of a database service at which a key access frequency limit has been exceeded, the storage node may return a response indicating that a throttling exception has occurred and that the request was therefore not processed. Throttling of access requests to database systems can occur for a variety of reasons. In a distributed database system, for example, there can be multiple different token buckets that limit the rate of access at different points. Throttling can occur because the storage node ran out of resources, because the system ran out of tokens in a particular token bucket, or because the database system is accessing a particular partition or a particular key within a partition too many times. However, such throttling exception messages currently provide little additional information to the client device or user about the exact cause of the throttling exception (for example, whether a general throttling exception for the table occurred, or whether requests for the currently requested key or a different key is causing the throttling to occur, and so forth). Thus, it is often challenging for users or client applications to take appropriate corrective measures in response to occurrences of such throttling, or to take measures to prevent such throttling from occurring in the first place.

When throttling occurs because the overall accesses of a partition exceeds whatever the throughput level is for the partition, this can be described as the hot partition problem. If a partition is hot, but any particular key is not hot, then the partition can be split into two partitions such that the keys that constitute roughly half the accesses are split into the first new partition, and the keys that constitute roughly the other half of the accesses are split into the second new partition, for example. However, if a single key in a partition is hot, then there is not very much that the distributed database operator, such as the provider network, can do to overcome the "hot key" problem.

Clients of database systems might have their access requests to certain partitions of the database systems throttled because of this "hot key" issue. When a client's access requests become throttled, the client receives a notification that its access requests were throttled. Clients who have their access requests throttled at the partition level would like to know if the problem is a "hot key" and, if so, which key is the "hot key." If a client of a database system knows that a hot key exists, and which key is the hot key, then the client can perform actions to limit the accesses to the hot key. When clients know this type of information, the clients can make proactive decisions to prevent the issue from happening, or limiting the issue, or the effects of the issue, for example.

These proactive actions that might be performed by clients who know what keys are the "hot keys" can be, for example, caching the value of the hot key on the client's end. The actions can also include throttling accesses at the client's end if, for example, the client's system is a multi-tenant system. For example, a client might have an abusive customer that is requesting an inordinate number of accesses to the database system, or certain keys of the database system, and the client might proactively limit the accesses of its own customer. A client might also implement patching at their end, so that multiple writes to the database system get combined in to a single write, and multiple reads get combined into a single read, for example.

Embodiments of the current invention can give clients insight outside of the data plane of key access patterns for an extended period of time. The period of time could be any period of time depending on the embodiment, such as key accesses over the last day, over the last hour, or over the last minute. Embodiments of the current invention can inform clients what the application key access pattern is, whether the access pattern is skewed, and what keys are being accessed more often than others. At least some embodiments can track these access patterns on a fleet-wide basis, such as on an entire table level, rather than simply on a storage node level or replica level monitoring. Instead of monitoring these access patterns in the data plane or the data path itself, at least some embodiments of the current invention can utilize a separate distributed system to perform the tracking and monitoring. This allows for the remote tracking and identification of hot keys to be scalable, and to not impact a database systems latencies or availability.

The data plane of the database system sends certain information to a separate distributed tracking system, in some embodiments. In some of these embodiments, this separate distributed tracking system can be offloaded to computing systems on the edge of the database system or the provider network, where more computing resources are available, rather than keeping these types of computations on the storage node, or in the data path, where the computing resources are limited. In some embodiments, the distributed tracking system can collect statistical data indicating a frequency with which such requests are received for each key for which the distributed tracking system is responsible. The statistical data collected for each key can be further used to calculate a normalized value relative to a maximum key access frequency supported by the storage nodes, where this normalized value may be referred to as a "frequency score." Here, a maximum key access frequency indicates a frequency limit above which additional requests to the storage node may be throttled, for example, because the underlying storage devices or other hardware may not be able to support higher frequencies.

Key accesses can be tracked both access requests that are throttled, as well as access requests that are not throttled, in some embodiments. In these embodiments it is not necessary for a request to be throttled in order for the key accesses of that request to be tracked. For example, requests that are within the bound of a partition limit can be tracked. In some of these embodiments, a request might be near to be throttled, because, for example, too many access requests have already occurred within a certain amount of time. As an example, if the access request are increased by another 10%, then access requests would run into a throttling problem. Embodiments of the current invention can give clients notification ahead of time that throttling might begin to occur. Some of these embodiments can provide clients with the key access pattern for a partition or the entire table at any particular moment in time.

Embodiments of the remote key tracking system can provide this type data to clients in multiple ways, depending on the embodiment. In some embodiments, the tracking system might communicate with devices in the data path of the database system in order to provide additional information to clients through the data plane of the database system. This additional information could be provided to clients in real-time in some embodiments. This additional information can be in the form of additional information in a throttling message that is provided by the database system to clients, for example. This additional information can be the partition that was throttled as well as the hottest keys of that partition and/or the number of accesses or access frequency of certain keys, depending on the embodiment. The remote key tracking system can also aggregate information regarding key accesses and provide this information of previous time windows to the client separately, for instance, through responding to API calls. In some embodiments, a client might open dashboards that contain access pattern information. The clients can use the information to learn more about the access pattern, or use the information in post-mortum analysis, for example. A client can learn which of their customers is responsible for the throttling of a key being throttled, for example.

In order for the key tracking service to tracking and enable access to information about key access patterns for database tables, first an intermediate node in the data plane of a database system, such as a request router, makes a request to a storage node of the database system, in some embodiments. In these embodiments, the storage node returns the results of the request to the request router. In addition to the results of the request, the storage node can return additional information, such as for example, information regarding the access frequency of a partition used in obtaining the results of the request. This information can be, as one example, the number of tokens in the storage node's peak throttling bucket.

Key access information extractors can obtain key information from the responses to the access requests provided by the individual storage nodes, in some embodiments. This key access information extractor can be, for example, a daemon that resides on an intermediate node in the data plane of the database service, such as the request router. In some embodiments, a client that resides on the intermediate storage node, such as the request router, can send the key that was accessed as part of the access request to the key access information extractor. This client might also include other information as well to the key access information extractor. The key access information extractor can batch the information it receives, in some embodiments. This information can be, for example, the keys that the key access information extractor has received or obtained and/or how many times, or an indication of the frequency with which, it has received or obtained them.

The key access information extractors can use this information to determine whether or not to track the keys of a partition based on any received indications of any frequency of access information for the partition. For example, the key access information extractors can use indications of the frequency of access information for a partition associated with an access request response to determine whether these indications of the frequency of access information for the partition are greater than a threshold. An indication of frequency of access information used to make this determination might be, for example, the number of times a partition has been accessed, the amount of times accessed in a certain time period, information about how close a partition is to being throttled, how full a particular token buck is, or any other information about the accesses, or lack thereof, of a partition. If this indication of frequency of access for the partition is greater than a particular threshold, such as there are more accesses than the threshold allows, then the key access information extractors can send information comprising the one or more keys associated with the partition to one of the plurality key trackers, in some embodiments.

This determination can be performed as an optimization so that the key tracking service does not track all they keys of a database service. By only receiving information about partitions or keys, depending on the embodiment, that have been accessed more than some threshold, for example, then the key tracking service can ignore those keys and/or partitions that have not been accessed recently, for example, or can ignore those keys and/or partitions and are not close to being throttled. In one embodiment, partitions with only one access per second are ignored, but partitions with more than one access per second are tracked. In some embodiments, this kind of optimization can eliminate tracking for over 90% of the keys and/or partitions, thus eliminating over 90% of unneeded traffic, communication, computation, and/or storage space for the key tracking service. This traffic, communication, computation, and/or storage space is unneeded since it would be for keys and/or partitions that are not close to being throttled, and thus have no need of being tracked, in some embodiments. However, some embodiments might track all the keys and/or all the partitions, for example, and the above determination is simply an optimization used by certain embodiments.

In some embodiments, in response to a key access information extractor determining that a key is associated with an access frequency score that exceeds a defined "hotness" threshold, the key may be added to a "hot key" list managed by the key tracking service. The hot key list may thus represent a set of one or more keys potentially nearing the maximum request frequency limit, in some embodiments. Using such hot key lists, for example, the key tracking service can include identifiers of hot keys and associated access frequency scores in response messages (for example, either providing an access frequency score of a requested key nearing the maximum request frequency limit or providing an identifier of one or more keys with the highest access frequency scores in the case of a throttled request). Among other benefits, the monitoring and collection of key access pattern data enables users and client devices to better understand key access patterns for their database tables, to identify "hot" keys that may lead to throttling and to take proactive actions to avoid such throttling, to more easily diagnose which keys are causing throttling exceptions to occur, and to analyze and view historical key access trend patterns.

The key access information extractor can then occasionally send its batched information to a fleet of key trackers, in some embodiments. The key access information extractor can send its information, whether batched or not, to any key tracker in the fleet of key trackers, in some embodiments. In these embodiments, it does not matter which key tracker the fleet of key trackers the key access information extractor sends its information to. The key access information extractor can simply send the information to the nearest or most easily accessible key tracker, in some of these embodiments.

The key trackers can receive data from multiple key access information extractors associated with multiple storage nodes, in some embodiments. The information received by the key trackers can be associated with one or more partitions of the database table, and can comprise at least one or more keys of the one or more partitions, where the keys are associated with one or more of the responses to the access requests that are provided by the storage nodes. The key trackers can also batch the information they receive, in some embodiments.

The key trackers can then occasionally send its information, whether batched or not, to a fleet of aggregators, in some embodiments. The aggregators can be assigned to a particular table, or to one or more partitions of a given table depending on the embodiment. An aggregator can receive information from every key tracker that possesses information for the table, or the partitions within a table, for which it is assigned, depending on the embodiment. In some of these embodiments, the aggregator can aggregate the disparate information received from the various key trackers regarding key access information for the tables, or partitions within a table, for which it is assigned. The aggregator can create a unified set of information that encompasses the accesses across the entire database system for the tracked keys of the aggregator's assigned table(s) or partition(s), in some embodiments.

A given table can encompass thousands of storage nodes, and accesses to those storage nodes can operate on thousands request routers, with thousands of key access information extractors obtaining key information for those accesses, for example, depending on the embodiment. The key trackers can have partial information about the accesses to any given key based on the information it has received from its group of key access information extractors from which it has received data. The key trackers know which aggregators to communicate with regarding the keys of particular partitions or particular tables, and will communicate the information about the appropriate keys to the appropriate aggregators that are assigned to handle those keys (whether it be at the table or partition level).

The aggregators know which tables or partitions they are assigned to aggregate the key information for, in some embodiments. The aggregators aggregate the information for the tables or partitions to which they are assigned, in some embodiments. The aggregators might determine certain key access metrics using the information it has received, depending on the embodiment. The aggregators might determine a frequency of access information for individual ones of the one or more keys of the respective tables or partitions to which it is assigned, in some embodiments. The aggregators might also determine one or more of the most frequently accessed keys of a particular partition or a particular table from the frequency of access information, in some embodiments. The aggregators might store this information in a storage service. For example, the aggregators might store key access metrics and/or a top key list for the partitions or tables they are assigned to handle.

Therefore, according to embodiments described herein, to enable users to better understand and monitor key access patterns, a key tracking service is configured to monitor and collect key access pattern metrics for requests received by the storage nodes of a database system, to identify "hot" keys that are associated with request frequencies exceeding a defined threshold, and to optionally return various types of key access information with responses to the devices from which the requests originate. This key access information can be provided to users and client applications so that various proactive actions can be taken, if needed (for example, by caching records associated with certain highly requested keys, or programmatically reducing request frequencies for highly requested keys, and so forth). Furthermore, if a request is throttled by a storage node, the database service can use information from the key tracking service to return more detailed information indicating a reason for the request being throttled, for example, by identifying one or more keys that are currently exceeding or nearly exceeding the key access frequency limit. The key access information collected by the key tracking service can further be aggregated and analyzed to identify historical key access patterns of interest for entire database tables, and further used to generate various visualizations and other data representations that enable users to better understand their applications' key access patterns over time.

Embodiments for Remote Tracking and Identification of Key Access Patterns for Databases FIG. 1 is a diagram illustrating an environment for remote tracking and identification of keys for databases, including a database service and a key tracking service according to some embodiments. In some embodiments, a database service 102, as well as any number of other possible services, operate as part of a service provider network 100 and each comprise one or more software modules executed by one or more electronic devices at one or more data centers and geographic locations. User(s) using one or more electronic device(s) (which may be part of or separate from the service provider network 100) can interact with the various services of the service provider network 100 via one or more intermediate networks, such as the internet. In other examples, external clients 104 or internal clients 105 can interact with the various services programmatically and without user involvement.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (for example, the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As indicated above, service provider networks have enabled developers and other users to more easily deploy, manage, and use a wide variety of computing resources, including databases. The use of a database service 102, for example, enables users to offload many of the burdens of hardware provisioning, setup and configuration, replication, clustering scaling, and other tasks normally associated with database management. A database service further enables users to scale up or scale down tables' throughput capacity with minimal downtime or performance degradation, and to monitor resource utilization and performance metrics, among other features. Users can easily deploy databases for use in connection with a wide variety of applications such as, for example, online shopping carts, workflow engines, inventory tracking and fulfillment systems, and so forth.

In some embodiments, a database created by a user of a service provider network 100 is composed of one or more tables, items, and attributes. A table is a collection of items, and each item is a collection of attributes. Primary keys are used to uniquely identify each item in a table, and secondary indexes can be used to provide additional querying flexibility if desired. For example, a user developing a contact management application may use a database service to create a People table, where each item stored in the table represents a person managed by the application. The example People table may further include various attributes for each item such as, for example, a PersonID, LastName, FirstName, and so forth. In this example, the PersonID attribute may further serve as the primary key for the table, meaning that each record is associated with a unique value for the PersonID attribute. Other than the primary key, the People table generally may be schema-less, meaning that neither the attributes nor their data types need to be predefined.

As illustrated in the example above, when a table is created in a database, in addition to a table name, a primary key of the table is specified. The primary key uniquely identifies each item in the table such that no two items can have the same key. In some embodiments, a database supports at least two different kinds of primary keys: a partition key, composed of one attribute of the items in the table, or a composite primary key composed of two attributes. For a composite primary key, a first selected attribute may be referred to as the "partition key" and a second selected attribute referred to as the "sort key." In a table that uses a composite primary key, it's possible for two items to have a same partition key value, however, any two such items are then required to have distinct sort key values.

In some embodiments, a database service 102 further enables the creation of secondary indexes on a table. A secondary index enables the querying of data stored in a table using an alternate key in addition to queries against the primary key. At least two different types of secondary indexes may be supported by a database service including, for example, a global secondary index (an index with a partition key and sort key that can be different from those on the table) or a local secondary index (an index that has a same partition key as the table but a different sort key).

In some embodiments, a database service 102 enables users to access and perform operations on data stored in a database via an API. The API, for example, may include various operations used create and manage tables such as, for example, operations to create a new table (including the optional creation of one or more secondary indexes), to obtain table description information (including, for example, its primary key schema, throughput settings, index information, and so forth), to return the names of all tables in a list, to modify the settings of a table or its indexes, and to delete a table. The API operations may further include operations used to perform create, read, update, and delete (also known as "CRUD") actions on data in a table. Such operations may include, for example, writing items to a table, retrieving items from a table, updating one or more attributes of items in a table, and deleting items from a table.

In some embodiments, a database service 102 stores the data for a database created by a user in partitions located across one or more storage nodes (for example, the partition(s) 108 stored at storage nodes 110 in FIG. 1). A partition is an allocation of storage for a table. In some embodiments, the storage is backed by solid-state drives (SSDs) (for example, storage devices 112) and may be automatically replicated across multiple storage nodes 110 each located in an area that is isolated from other areas for the purposes of fault tolerance and stability. Furthermore, the partition management may be handled by the database service 102 and without user involvement.

As indicated above, a primary key (whether it be a partition key or a composite primary key) is used to access records stored in a database. In general, developers are advised to design applications such that accesses to the table are uniform across all primary keys in the table, if possible. In some embodiments, once traffic starts to be received by one or more storage nodes storing a database table, a database service 102 is configured to automatically support various access patterns so long as the access patterns do not exceed one or more defined throughput limits. In some embodiments, a database service 102 can split users' workloads onto multiple partitions by automatically identifying keys that are receiving the most workload. If a user's database, for example, has two keys on a same partition that are both receiving a heavy workload, the service 102 can automatically split the partition across two or more storage nodes so that the active keys live on their own partition. However, as mentioned above, there nonetheless remains a limit to a frequency with which a storage node supports requests for a single key. In some embodiments, if the defined maximum frequency limit for a key is exceeded, the storage nodes return a throttling exception message and do not process the request.

In FIG. 1, it assumed that a user has created a database table using the database service 102. In some embodiments, when a table is created, initially the table is in a "creating" status during which the database service 102 allocates sufficient partitions 108 to the table so that it can handle a user's provisioned throughput requirements. A user can begin writing and reading table data after the table status changes to an "active" status. In some embodiments, a database service 102 allocates additional partitions to a table in at least the following situations: a user increases the table's provisioned throughput settings beyond what the existing partitions are able to support, or an existing partition fills to capacity and more storage space is needed. Once the table is created and active, users and client applications can begin sending requests to interact with data stored in the table.

In FIG. 1, one or more external clients 104 or internal clients 105 generate application traffic (e.g., data plane traffic) that involves data items in one or more tables stored on the storage nodes 110. As indicated above, each table may be stored as a collection of one or more partitions 108 spread across one or more storage nodes 110. The application traffic, for example, can be generated by the external clients 104 or internal clients 105 as part of the clients' interaction with the created database (for example, to put, get, modify, and delete data items). The external clients 104 or internal clients 105 thus generally represent any type of client device that can communicate with the database service 102 via a network including, for example, desktop computers, laptop computers, mobile devices, gaming devices, set-top boxes (STB), servers, and the like. The amount of traffic generated by the external clients 104 or internal clients 105 for a particular database, and for particular data items stored in a database, can vary over time in response to changes in the time of the day, day of the week, special events, overall popularity of an application or service using the database, or in response to any other conditions.

A request router 116 receives the application traffic and routes the traffic to storage nodes 110. In some embodiments, a request router 116 uses partition metadata 118 to identify, for a request identifying a particular key, a location of a partition 108 at a storage node 110 storing the data item identified by the key. Once the storage node 110 storing the relevant partition is identified, the request router 116 forwards the request to the identified storage node 110. In some embodiments, the request router 116 optionally further performs other request validation and authentication operations as part of processing and routing each request.

The storage nodes 110 process the application traffic received from the request router 116, including the manipulation of data stored by the storage nodes according to the requested operations, and further including the creation and management of one or more data structures used to collect metrics reflecting a frequency with which keys managed by the storage node are accessed (that is, a frequency with which individual keys are the subject of a request to get, put, update, etc., a record stored by the storage node).

In some embodiments, part of a storage node 110 processing a request includes calculating a number of read or write "units" consumed by the request. For example, each request may consume one or more units depending on the size of the record or item involved in the operation such that operations involving larger data items may consume more read or write units. As one example, an example database service 102 may define one request unit as being able to process up to 4 kilobytes worth of data (or any other defined amount of data in other implementations). In this example, if a request is received to read an item that is 7 kilobytes in size, then two read units may be consumed to process the request. In some embodiments, a database service 102 uses a "token bucket" concept to manage a rate at which requests can be processed according to a provisioned amount of capacity of read and/or write units. A token bucket, for example, can be filled with "tokens" at a certain constant rate, and each read or write unit consumes one token in the bucket. If enough tokens are available to process a received request, then the request is processed; otherwise, the storage node may throttle the request and only process new requests when additional tokens become available. In some embodiments, a frequency of key accesses is measured with respect to calculated read or write units; in other examples, key access frequency metrics can be based solely on the number of requests identifying each key.

Key access information extractors 117 can obtain key information from the responses to the access requests provided by the individual storage nodes 110, in some embodiments. This key access information extractor 117 can be, for example, a daemon that resides on an intermediate node in the data plane of the database service, such as the request router 116. In some embodiments, a client (not shown) that resides on the intermediate storage node, such as the request router 116, can send the key that was accessed as part of the access request to the key access information extractor 117. This client might also include other information as well to the key access information extractor. The key access information extractor 117 can batch the information it receives, in some embodiments. This information can be, for example, the keys that the key access information extractor 117 has received or obtained and/or how many times, or an indication of the frequency with which, it has received or obtained them.

The key access information extractors 117 can use this information to determine whether or not to track the keys of a partition based on any received indications of any frequency of access information for the partition. For example, the key access information extractors 117 can use indications of the frequency of access information for a partition 108 associated with an access request response to determine whether these indications of the frequency of access information for the partition are greater than a threshold. An indication of frequency of access information used to make this determination might be, for example, the number of times a partition has been accessed, the amount of times accessed in a certain time period, information about how close a partition is to being throttled, how full a particular token buck is, or any other information about the accesses, or lack thereof, of a partition. If this indication of frequency of access for the partition is greater than a particular threshold, such as there are more accesses than the threshold allows, then the key access information extractors 117 can send information comprising the one or more keys associated with the partition to one of the plurality key trackers 142 of the key tracking service 140, in some embodiments.

This determination can be performed as an optimization so that the key tracking service 140 does not track all they keys of a database service. By only receiving information about partitions or keys, depending on the embodiment, that have been accessed more than some threshold, for example, then the key tracking service 140 can ignore those keys and/or partitions 108 that have not been accessed recently, for example, or can ignore those keys and/or partitions 108 that are not close to being throttled. In one embodiment, partitions with only one access per second are ignored, but partitions with more than one access per second are tracked. In some embodiments, this kind of optimization can eliminate tracking for over 90% of the keys and/or partitions, thus eliminating over 90% of unneeded traffic, communication, computation, and/or storage space for the key tracking service. This traffic, communication, computation, and/or storage space is unneeded since it would be for keys and/or partitions that are not close to being throttled, and thus have no need of being tracked, in some embodiments. However, some embodiments might track all the keys and/or all the partitions, for example, and the above determination is simply an optimization used by certain embodiments.

The key access information extractor 117 can then occasionally send its batched information to a fleet of key trackers 142, in some embodiments. The key access information extractor can send its information, whether batched or not, to any key tracker in the fleet of key trackers 142, in some embodiments. In these embodiments, it does not matter which key tracker the fleet of key trackers 142 the key access information extractor 117 sends its information to. The key access information extractor 117 can simply send the information to the nearest or most easily accessible key tracker, in some of these embodiments. The operation if the key tracking service 140 and the key trackers 142 will be described in relation to FIG. 2. It should be noted that the entire key tracking service can be a separate service from the database service, or parts of the service might be part of the database service, or parts of the described key tracking service 140 might be associated with other kinds of services of the provider network, or other third-party services altogether, depending on the embodiment.

Figure 2:
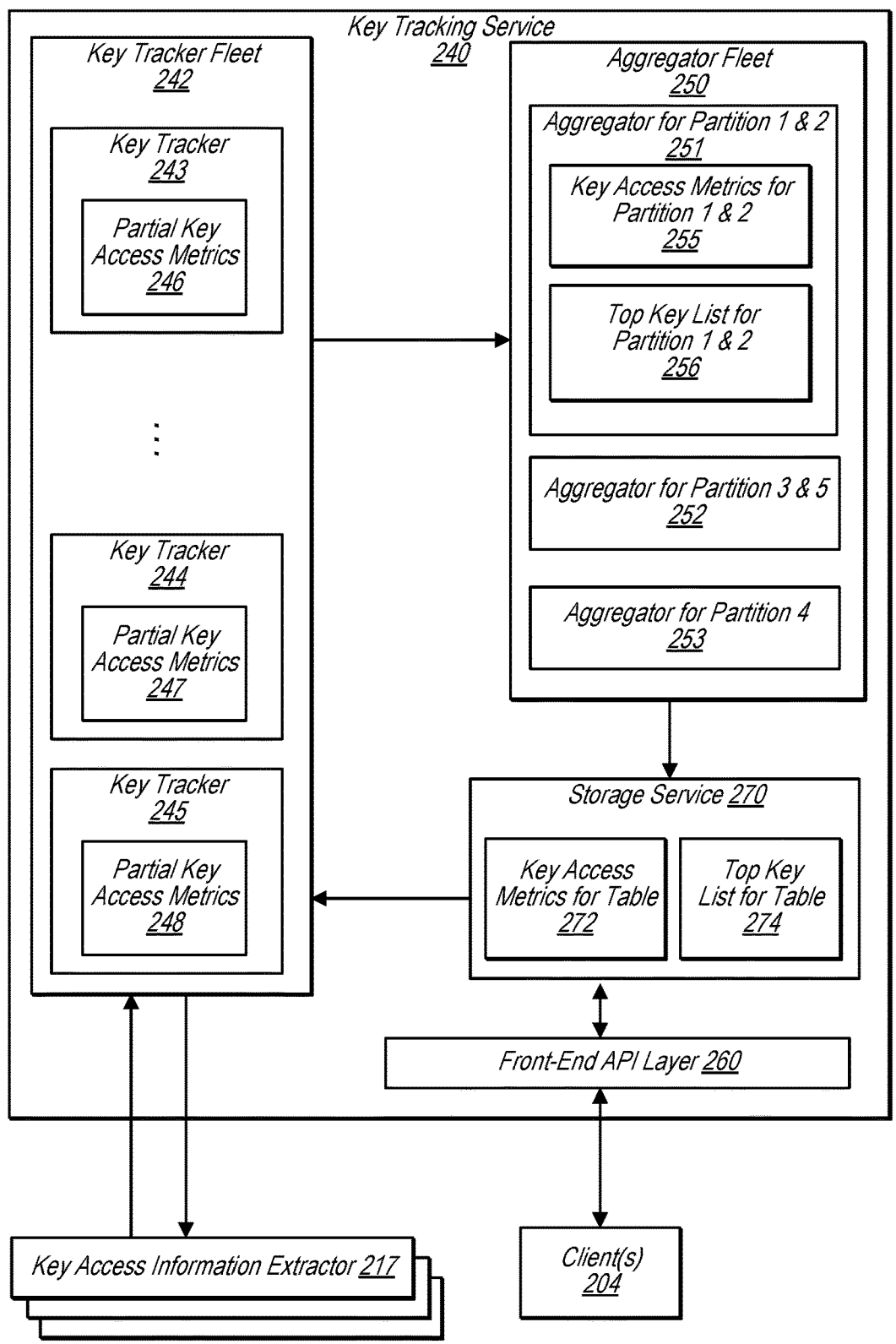
FIG. 2 is a diagram illustrating example components of the key tracking service according to some embodiments.

FIG. 2 is a diagram illustrating example components of the key tracking service used to monitor and collect data indicating key access patterns, according to some embodiments. The key tracking service 240 comprises a key tracker fleet 242, an aggregator fleet 250, a storage service 270, and a front-end API layer 260. The key tracker fleet 242 comprises any number of key trackers 243-245. Each key tracker includes partial key access metrics 246-248 for the keys and/or partitions that it has received data regarding. The individual key tracers 243-245 of the key tracker fleet 242 communicate with an aggregator fleet 250. The aggregator fleet 250 comprises any number of aggregators 251-253. The aggregators 251-253 can include key access metrics 255 and/or a top key list 256 for the partitions which it is assigned. In the embodiment shown in FIG. 2, aggregator 251 is assigned to partitions 1 and 2, aggregator 252 is assigned to partitions 3 and 5, and aggregator 253 is assigned to partition 4. The aggregators store their metrics and/or key lists in the storage service 270. The storage service 270 can include, for example, key access metrics for individual database tables 272 and/or top key lists for individual database tables 274. The Front-End layer 260 communicates with a client 204 to provide the aggregated metrics to the client. One or more components of this key tracking service 240 might be associated with other kinds of services of the provider network, or other third-party services, in some embodiments. For example, in some embodiments, the key tracker fleet 242 might be part of the provider network, or part of the database service, but the aggregator fleet 250 and the storage service 270 might be associated with other kinds of services of the provider network, or another third-party service altogether. Grouping these components in one key tracking service 240, as shown in FIG. 2, is only applicable to some embodiments, and other embodiments might have other groupings of these components.

The key trackers 243-245 of the key tracker fleet 242 can receive data from multiple key access information extractors 217 associated with multiple storage nodes, in some embodiments. The information received by the key trackers 243-245 can be associated with one or more partitions of the database table, and can comprise at least one or more keys of the one or more partitions, where the keys are associated with one or more of the responses to the access requests that are provided by the storage nodes.

The key trackers 243-245 can also batch the information they receive, in some embodiments. The key trackers 243-245 can then occasionally send its information, whether batched or not, to a fleet of aggregators 250, in some embodiments. The aggregators 251-253 of the aggregator fleet 250 can be assigned to a particular table, or to one or more partitions of a given table depending on the embodiment. An aggregator 251-253 can receive information from every key tracker 243-245 that possesses information for the table, or the partitions within a table, for which it is assigned, depending on the embodiment. In some of these embodiments, the aggregator 251-253 can aggregate the disparate information received from the various key trackers 243-245 regarding key access information for the tables, or partitions within a table, for which it is assigned. The aggregator 251-253 can create a unified set of information 255, 256 that encompasses the accesses across the entire database system for the tracked keys of the aggregator's assigned table(s) or partition(s), in some embodiments.

A given table can encompass thousands of storage nodes 110, and accesses to those storage nodes can operate on thousands request routers 116, with thousands of key access information extractors 217 obtaining key information for those accesses, for example, depending on the embodiment. The key trackers 243-245 can have partial information about the accesses to any given key based on the information it has received from its group of key access information extractors 117 from which it has received data. The key trackers 243-245 know which aggregators 251-253 to communicate with regarding the keys of particular partitions or particular tables, and will communicate the information about the appropriate keys to the appropriate aggregators 251-253 that are assigned to handle those keys (whether it be at the table or partition level).

The aggregators 251-253 know which tables or partitions they are assigned to aggregate the key information for, in some embodiments. The aggregators 251-253 aggregate the information for the tables or partitions to which they are assigned, in some embodiments. The aggregators 251-253 might determine certain key access metrics 255 using the information it has received, depending on the embodiment.

The aggregators 251-253 might determine a frequency of access information 255 for individual ones of the one or more keys of the respective tables or partitions to which it is assigned, in some embodiments. In one embodiment, a count-min sketch data structure is used is used, where a count-min sketch represents a probabilistic data structure that can serve as a frequency table of key accesses in a stream of requests. In other embodiments, other types of frequency counting algorithms for data streams can be used. In general, a count-min sketch or other data structure consumes a series of requests received for a partition and counts or estimates the frequency with which each key is the subject of a request (or in other examples a number of read or write units consumed for each key per unit of time).

The aggregators 251-253 might also determine one or more of the most frequently accessed keys 256 of a particular partition or a particular table from the frequency of access information, in some embodiments. In some embodiments, this can be a hot key list to track the top N keys that were accessed in the last minute (or other timeframe), for example, or to track any number of keys with a frequency that exceeds a defined threshold (for example, a "hot key" threshold). This can be based on tracking the frequency of the key accesses using a key access count data structure.

In some embodiments, the aggregators 251-253 might use probabilistic techniques to determine which keys to track in the key access metrics 255 and/or the top key list 256. An aggregator can only track a limited number of keys, and if it receives additional keys over and above this limited number, then the aggregator must determine which keys to track and which keys not to track. The aggregator can use probabilistic techniques to make this determination, in some embodiments. These probabilistic techniques might allow, in some circumstances, a key with a low count to displace a key with a higher count, based on a probability assigned to the key with the lower count. For example, these probabilities can ensure that a key with a count of 1 has a $\frac{1}{5}^{th}$ chance of displacing a key with a count of 5, in some embodiments. Other embodiments might assign other probabilities, or use different probabilistic techniques, to limit the number of track keys.

The aggregators 251-253 might store this information in a storage service 270. For example, the aggregators 251-253 might store key access metrics 272 and/or a top key list 274 for the partitions or tables they are assigned to handle. The number of keys, N, stored in the hot key list can vary depending on an amount of space available to store such information in the storage service 270, or based on any other desired criteria.

As indicated above, the key access metrics 272 data structure and a hot key list 274 can be used to maintain information about keys that have been frequently accessed in a past time window. In some embodiments, the storage service 270 associated with the key tracking service 240 can maintain other information about key accesses such as moving averages or other calculations that can be used, for example, to identify keys that remain "hot" for sustained periods of time, keys that are hot only in short and possibly periodic bursts, or keys that follow other access patterns of interest. In some embodiments, a threshold used to define when a key is "hot" can be pre-defined by the database service 102, customized by a user of the database service 102 or the key tracking service 240, adaptive to a particular user's key access patterns, or based on any combinations thereof.

Figure 3:
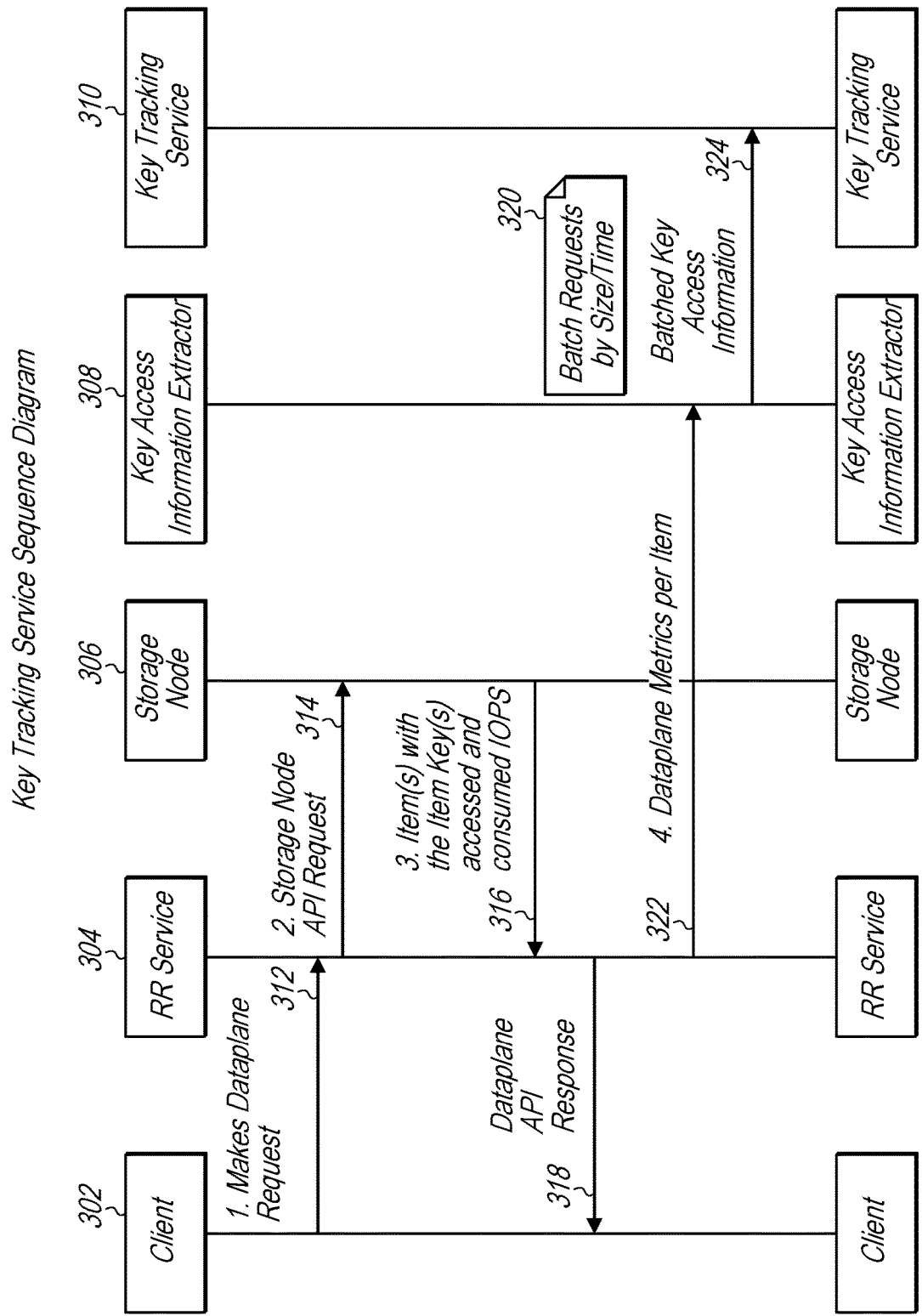
FIG. 3 is a diagram illustrating a key tracking service sequence diagram showing some of the communication between different components, according to some embodiments.

FIG. 3 is a diagram illustrating a key tracking service sequence diagram showing some of the communication between different entities of a provider network, according to some embodiments. In FIG. 3, when there is a new request 312 coming from a client 302 to a request router service 304, the request router service processes the request as it is. The request is routed 314 to a storage node 306. The storage node 306 returns the item(s) requested along with the item key(s) accessed as well as consumed IOPS 316, in some embodiments, to the request router service 304. The request router service 304 uses the information to respond to the client 302 with a dataplane API response 318. After the request is processed, request router service 304 will send 322 the key access information of the request to the key access information extractor 308, which can be a local tracker daemon in the same node, in some embodiments. The key access information extractor can batch the information 320 by time and/or size and then send 324 the batched key access information to the key tracking service 310.

Figure 4:
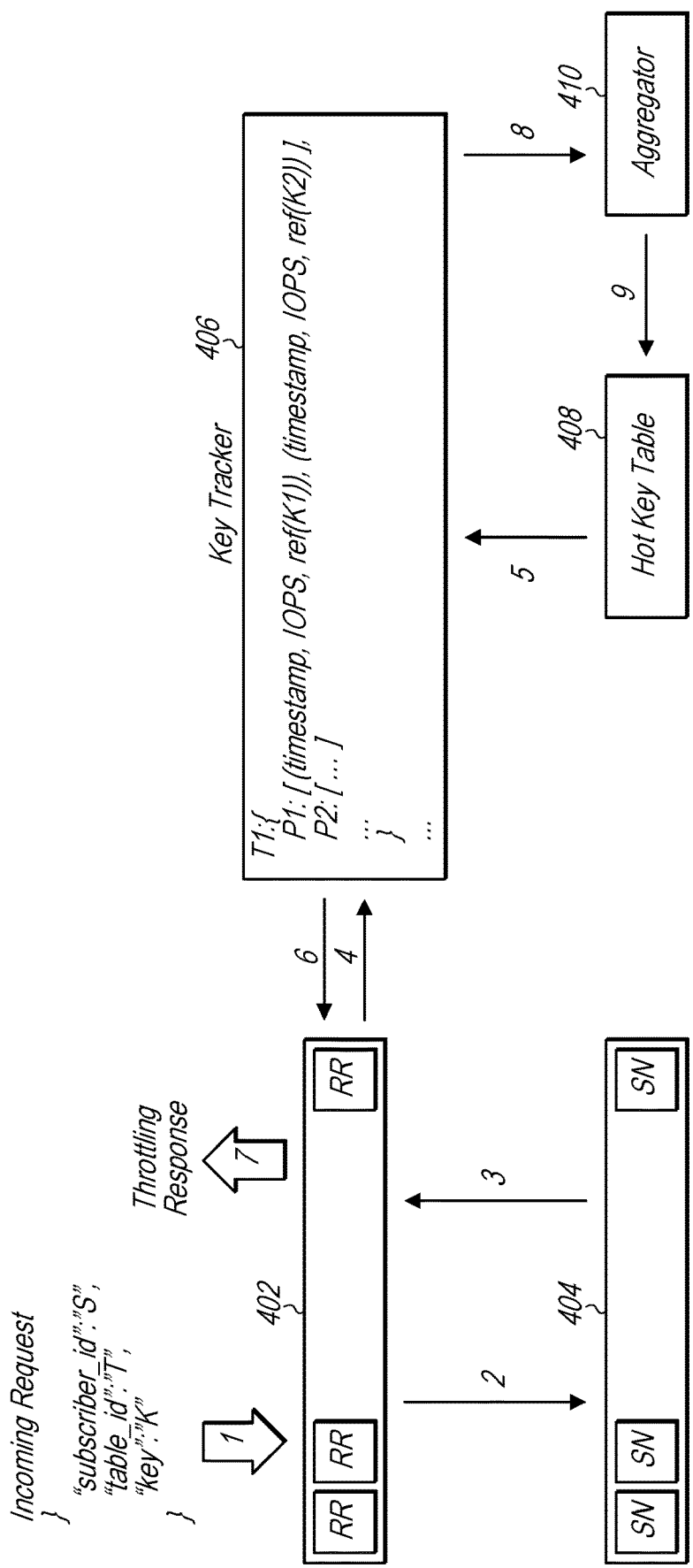
FIG. 4 is a diagram illustrating example processes for providing key access metrics collected by they key tracker service to other components of a service provider network according to some embodiments.

FIG. 4 is a diagram illustrating example processes for providing key access metrics collected by they key tracker service to other components of a service provider network according to some embodiments. At "1" in FIG. 4, for example, an incoming request is sent from a client device that to a request router 402. The request can include such information as a subscriber identification, a table identification, and/or a key. At "2", this request is routed by a request router 402 to a storage node 404. For example, the request may be any type of data plane call such as a request to "get," "put" or "update" an item that is stored in a partition managed by the storage node 404.

The requests may be generated in part by a user application that uses one or more database tables as a backend data store, in some embodiments. The requests may be generated on behalf of different users of the user application in response to various types of user interactions with the user application (for example, based on interactions with the user application by a first user associated with a client device and separately by a second user associated with a separate client device). In such situations, if the first user's interactions with the user application cause the application to exceed one or more throttling limits at the database service 102, the second user's experience may be degraded if the second user has data residing on the same storage nodes as the first user. Thus, it may be beneficial for the user application to obtain information indicating whether access to certain keys is in danger of exceeding any access frequency limits, as described herein, so that the application can take action to avoid such resultant throttling from impacting other users of the application (for example, by caching records associated with heavily accessed keys).

In some embodiments, requests generated by electronic devices optionally include a parameter indicating that the requesting user or application desires key access information to be returned with the response under certain circumstances (for example, when the key that is the subject of the request is determined to be a hot key, or if a throttling exception is returned). In this manner, key access information can be provided to requesting devices on an "opt-in" basis to avoid causing issues with requesting applications that may not be expecting the presence of the key access information in response messages. In other examples, key access information can be returned by default and without the need for requests to include any specific parameter or for users to opt-in.

In FIG. 4, at "3," the storage node 404 receiving the request determines whether or not the request can be successfully performed (for example, because the number of read or write units needed to process the request will not cause the storage node to exceed any applicable limits). The storage node 404 sends back its response, in some embodiments. The storage node 404 can also send a new piece of information with the response: the number of tokens remaining in the partition (combined read/write) peak token bucket, in some of these embodiments.

The request router 402 decides, based on the number of tokens returned by the storage node for example, whether or not to track this partition with the Key Tracker. This decision is made locally by the request router. If the decision is to track, then at step "4" the request router sends the table, partition, key, timestamp, and the number of IOPS consumed by the request to the Key Tracker 406. The Key Tracker 406 logs this request in storage, which can mapped by the partition's hash (which itself can be mapped by the table's id), in some embodiments.

If the response from the storage node to the client calls for additional information about the keys, then the Key Tracker 406 can access the hot key table 408 at step "5" to look at all the logged requests for that partition for a previous period of time, such as the past second, in some embodiments. This can be from the current timestamp or a sliding window. The key tracker can figure out which key was the hottest, or might simply receive the top hottest keys from the hot key table 408. The top hot key or keys is then returned to the request router at step "6."

At step "7" the request router 402 returns the response generated from the storage node 404, as well as top hot key or keys to the requesting client. The response from the request router 402 can also include a frequency score attribute indicating a relative "hotness" of the key. In some embodiments, the frequency score attribute is returned only if the score exceeds a defined hotness threshold (for example, half of the maximum frequency limit). In some embodiments, the frequency score included with the attribute is a calculated as a normalized value (for example, a number between 0 and 1) relative to the maximum access frequency limit. For example, if a key is currently being accessed with a frequency of 750 requests per second and the maximum frequency limit is 1,000 requests per second, then a normalized frequency score for the key may be calculated as 0.75 (which may exceed a defined hotness threshold of 0.5). In general, if a response message indicates that a requested key is currently hot, the requesting user or application can optionally take one or more actions to minimize the chance that the key ends up causing a throttling exception, for example, by caching the record associated with the key, throttling a number of requests associated with the key at the client application, or performing any other such actions.

In some embodiments, other calculations can be used to obtain a frequency score by the key tracker. Another example is that the frequency score for a key can be calculated as a normalized value based on a total number of read capacity unit or write capacity units consumed by all keys in the partition (for example, such that all keys on a partition are associated with a same access frequency score). In some embodiments, a harmonic mean calculation can be used that is based on both an access frequency score calculated for a partition as a whole and an access frequency for particular keys. For example, assume that a first key is being accessed at a frequency of 100 requests per second, a second key is being accessed with a frequency of 20 requests per second, and that the maximum frequency limit is 3,000 requests per second. In this example, an access frequency calculation for the first key can be calculated as: $2*((120/3,000)*(100/3,000))/((120/3,000)+(100/3,000))$.

The following is an example excerpt from a return object in step "7" from the request router in the case that a request is successfully processed by a storage node and the associated key is identified as a hot key:

```
{
  "ConsumedCapacity": {
    "CapacityUnits": 0,
```

```
    "ReadCapacityUnits": 1,
    "Table": {
        "CapacityUnits": 1,
        "ReadCapacityUnits": 1,
        "WriteCapacityUnits": 0
    },
    "TableName": "People",
    "WriteCapacityUnits": 0
},
"FrequencyScore": 0.6,
...
# Other return fields.
}
```

As shown above, the response message includes a "FrequencyScore" attribute and an associated frequency score value indicating that the requested key is currently at 0.6, which may exceed a defined threshold for hot keys.

An example of a request that results in a throttling exception message being returned by a storage node can also be illustrated with reference to FIG. 4 (for example, either because the requested key currently exceeds a maximum frequency limit, or because one or more other keys in the table have exceeded the request frequency limit). Similar to above, a client generates a request specifying a key identifying a record stored in a partition managed by a storage node 404, and a request router 402 thus routes the request to the storage node. The storage node 404 determines that the request cannot be satisfied because the request for the key exceeds a defined key access frequency limit, or because requests for another key in the partition has exceeded the limit, and the storage node 404 returns a message to the request router 402 including a throttling exception. In some embodiments, the request router communicates with the key tracker 406. The key tracker provides to the request router 402 key access frequency information indicating the keys currently being accessed with the greatest frequency, thereby providing an indication of which one or more keys are causing the throttling exception to occur (whether it be the same key as that included in the request or one or more other keys requested in other requests).

The following is an example excerpt from a return object in step "7" in the case of a storage node returning a throttling exception message:

```
{
    "message": "Your request rate is too high.",
    # Hot key access information
    "Key AccessMetrics": {
        "IsTemporary": true,
        "MostAccessedKey":
        {
            "PartitionKey": "hash_key_3",
            "SortKey": "sort_key1"
        }
    }
}
```

As shown above, the message includes information indicating that the request is being throttled and further includes a "KeyAccessMetrics" providing additional information about one or more hot keys associated with the partition. For example, the "KeyAccessMetrics" includes a "MostAccessedKey" attribute that includes information about one or more keys currently associated with a highest access frequency. In some embodiments, the response information further includes an "IsTemporary" attribute indicating whether the throttling is temporary, for example, because the partition can be split to avoid additional throttling, or whether the throttling is occurring because of a single key exceeding a frequency limit.

The key tracker can batch the information it receives, and every so often, or at regular intervals, the Key Tracker can send data to the aggregator 410 in step "8." In other embodiments, the aggregator 410 can periodically retrieve a streams record and create hourly/daily aggregates for step "8." The aggregator can store data, such as the top 10 hot keys for each table, for example, to the Hot Key Table for that account in step "9." Each hot key that is written to the Hot Key Table in this step, can be encrypted using the encryption key for the table to which it belongs, in some embodiments.

Figure 5:
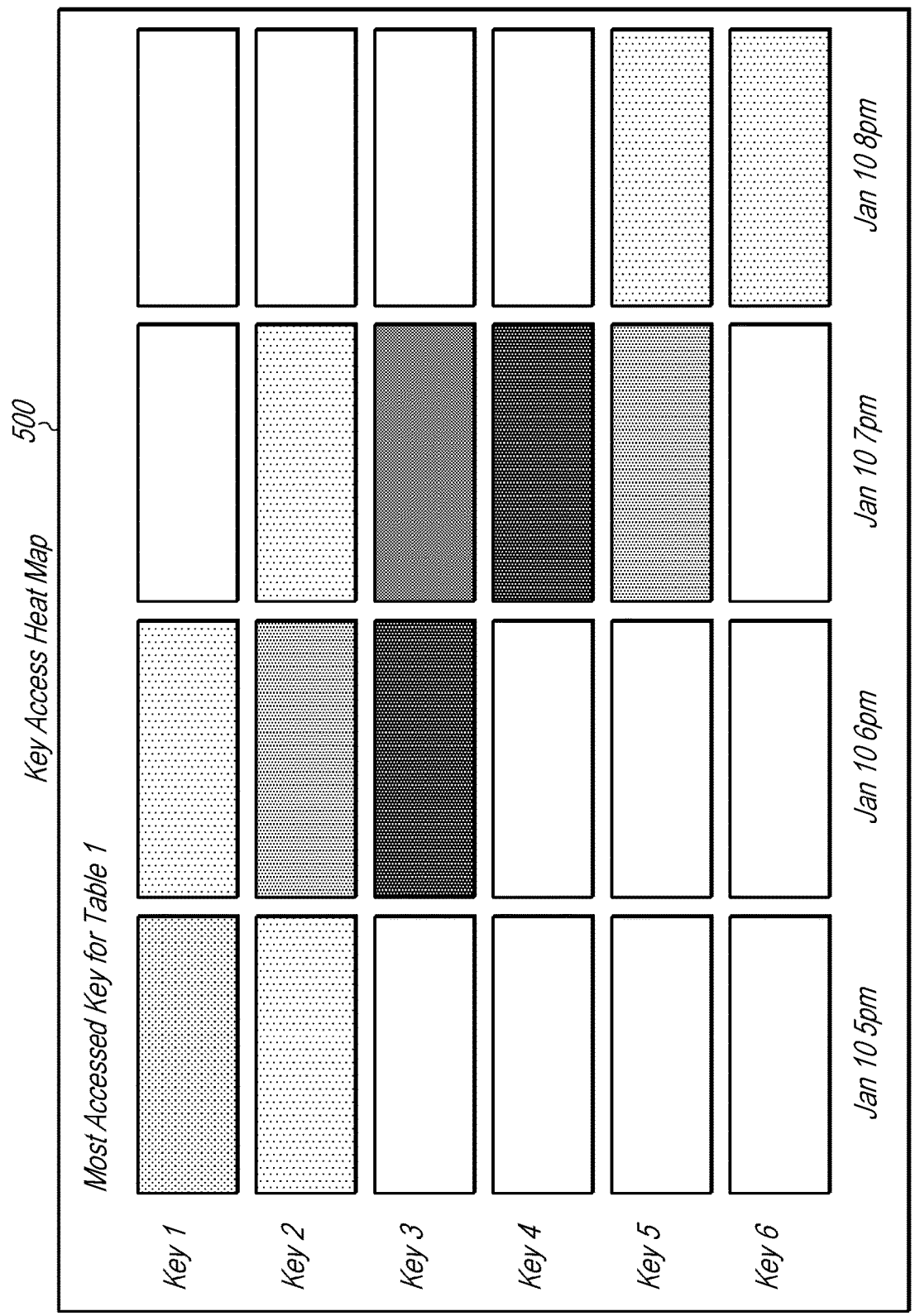
FIG. 5 is a diagram illustrating an example visualization of hot key information collected by the key tracker service according to some embodiments.

In some embodiments, a database service 102 further provides various graphical user interfaces (GUIs) that enable users to view visualizations and other graphical representations of hot key information for users' database tables. FIG. 5 illustrates an example of a graphical heat map visualization showing key access patterns over time according to some embodiments. For example, a key access pattern heat map 500 includes a tabular view of the frequency with which some number of most accessed keys were accessed over some period of time (for example, over the past day, week, or month). As shown, keys that were accessed more frequency than others during certain timeframes are displayed using heat map cells with greater degrees of shading (or using different colors or any other visual elements to distinguish the cells). In some embodiments, users can select certain portions of the heat map to drill up or down into other timeframes (for example, by selecting a region representing a day of the week to show a breakdown of key access frequencies for hours within the selected day, and so forth).

Figure 6:
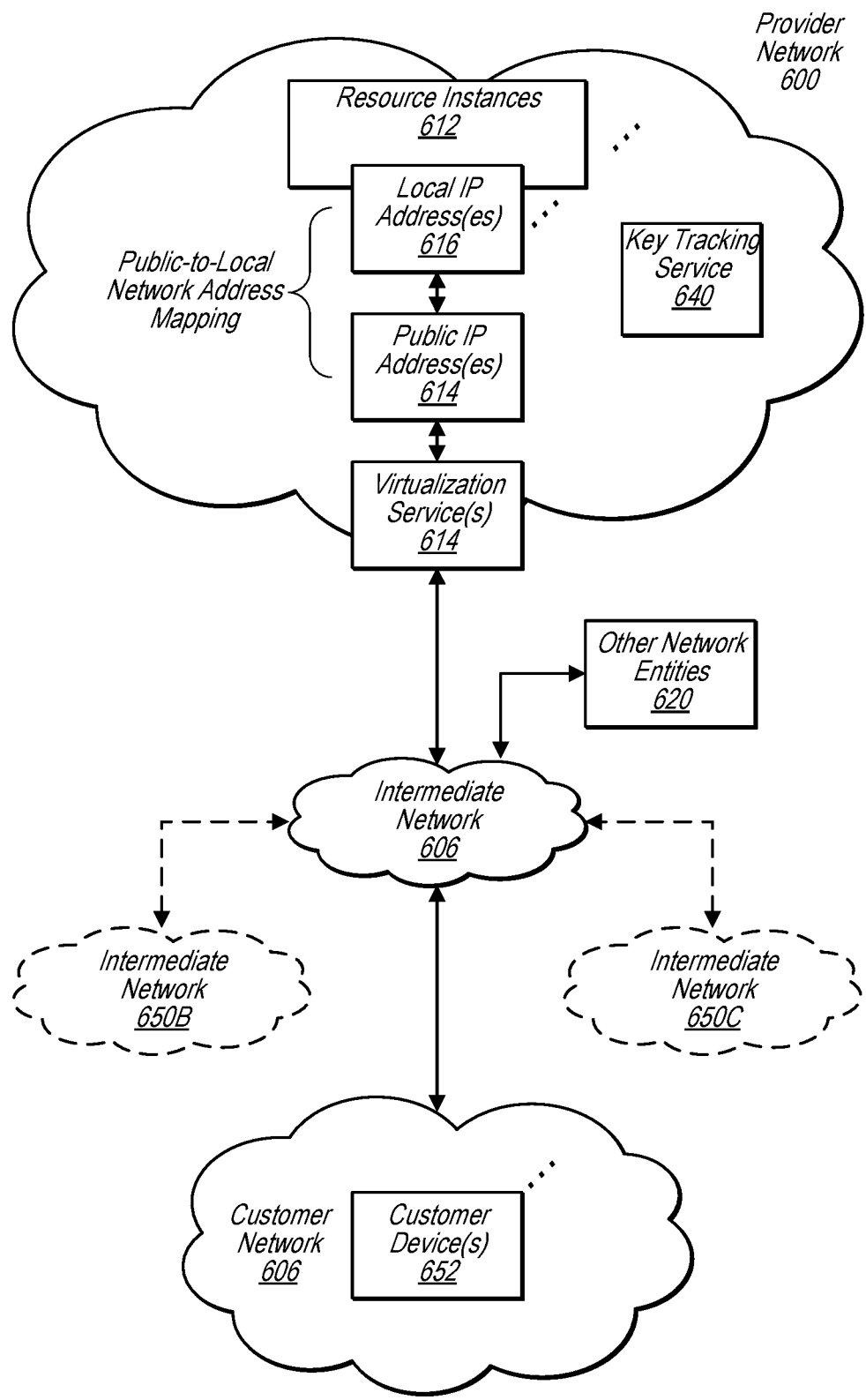
FIG. 6 illustrates an example provider network environment including a key tracking service according to some embodiments.

FIG. 6 illustrates an example provider network environment including a key tracking service according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
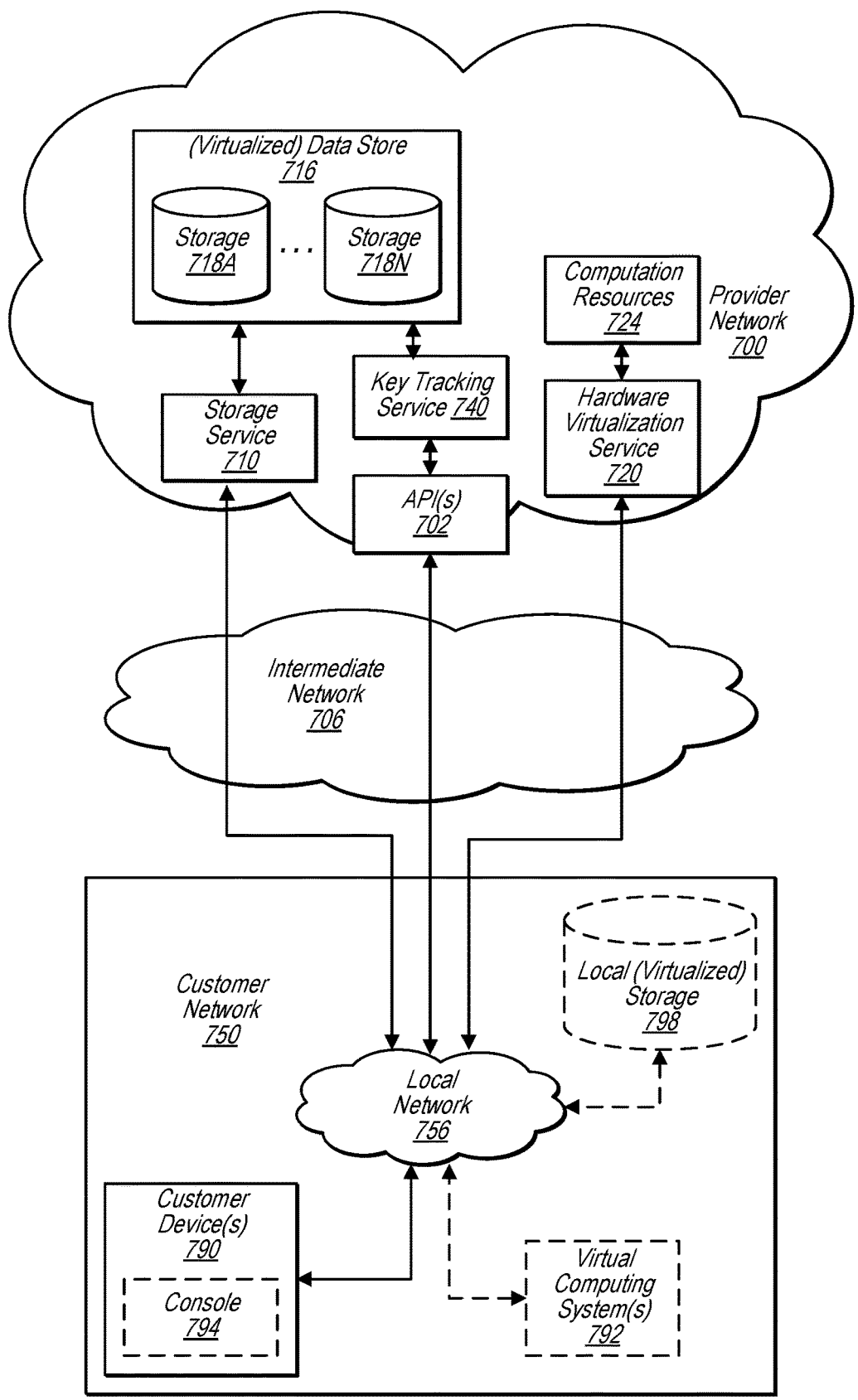
FIG. 7 is a block diagram of an example provider network that provides a storage service and a hardware virtualization service, as well as a key tracking service, to customers according to some embodiments.

FIG. 7 is a block diagram of an example provider network that provides a storage service and a hardware virtualization service, as well as a key tracking service, to customers according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 840 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
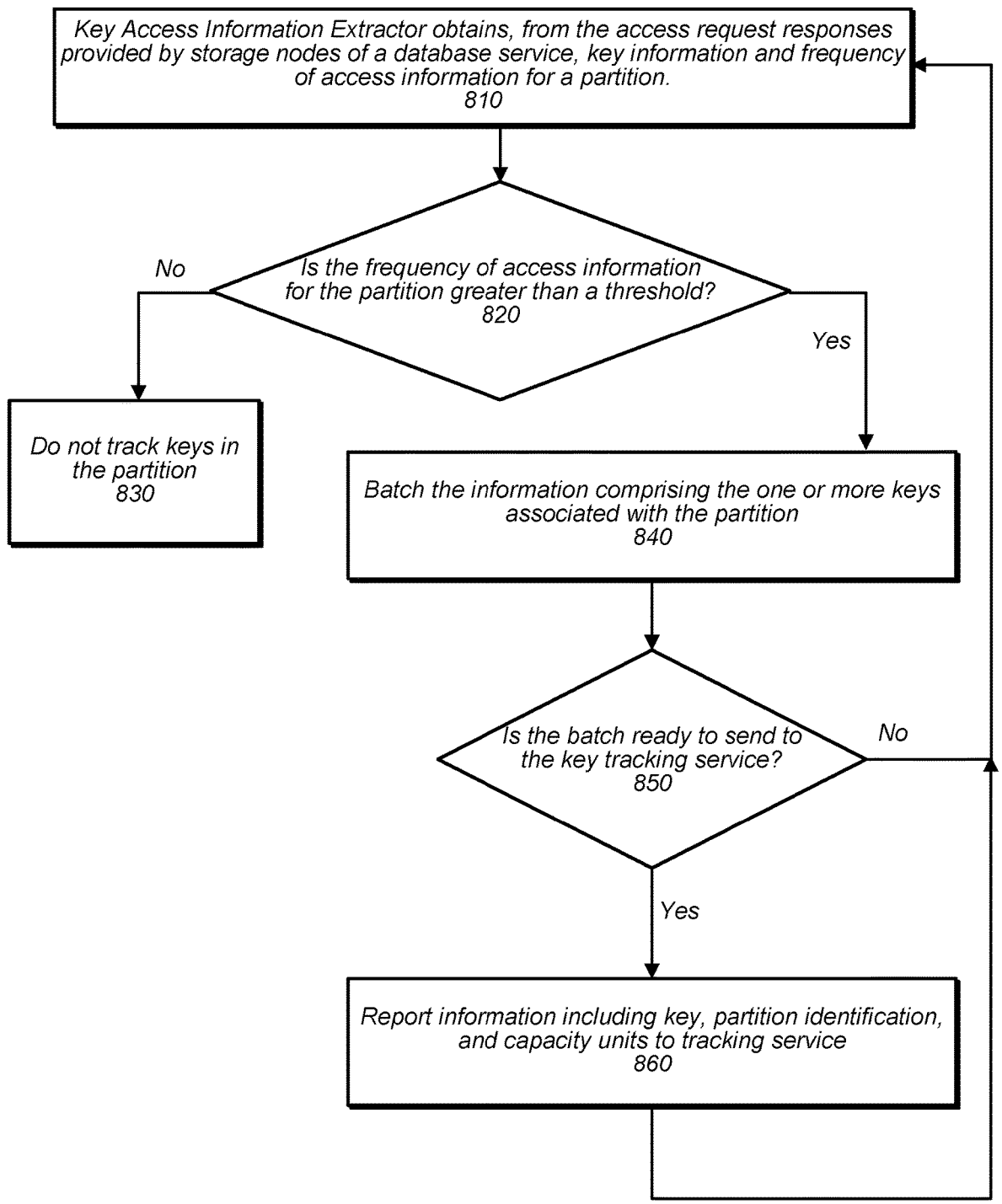
FIG. 8 is a flow diagram illustrating some of the operations of a key access information extractor according to some embodiments.

FIG. 8 is a flow diagram illustrating some of the operations of a key access information extractor according to some embodiments. At step 810 a key access information extractor obtains, from the access request responses provided by storage nodes of a database service, key information and frequency of access information for a partition. Then at 820, the key access information extractor determines if the frequency of access information for the partition greater than a threshold. If the frequency of access information for the partition is not greater than a threshold, then the flow proceeds to step 830 in which the keys in the partition are not tracked. If the frequency of access information for the partition is greater than a threshold, then the flow proceeds to 840 in which the key access information extractor batch the information comprising the one or more keys associated with the partition. The flow transitions to 850 where the key access information extractor determines if the batch is ready to send to the key tracking service. If the batch is not ready, the flow returns to 810. If the batch is ready, then the flow transitions to 860 where the key access information extractor reports information including key, partition identification, and capacity units to tracking service, in some embodiments.

Figure 9:
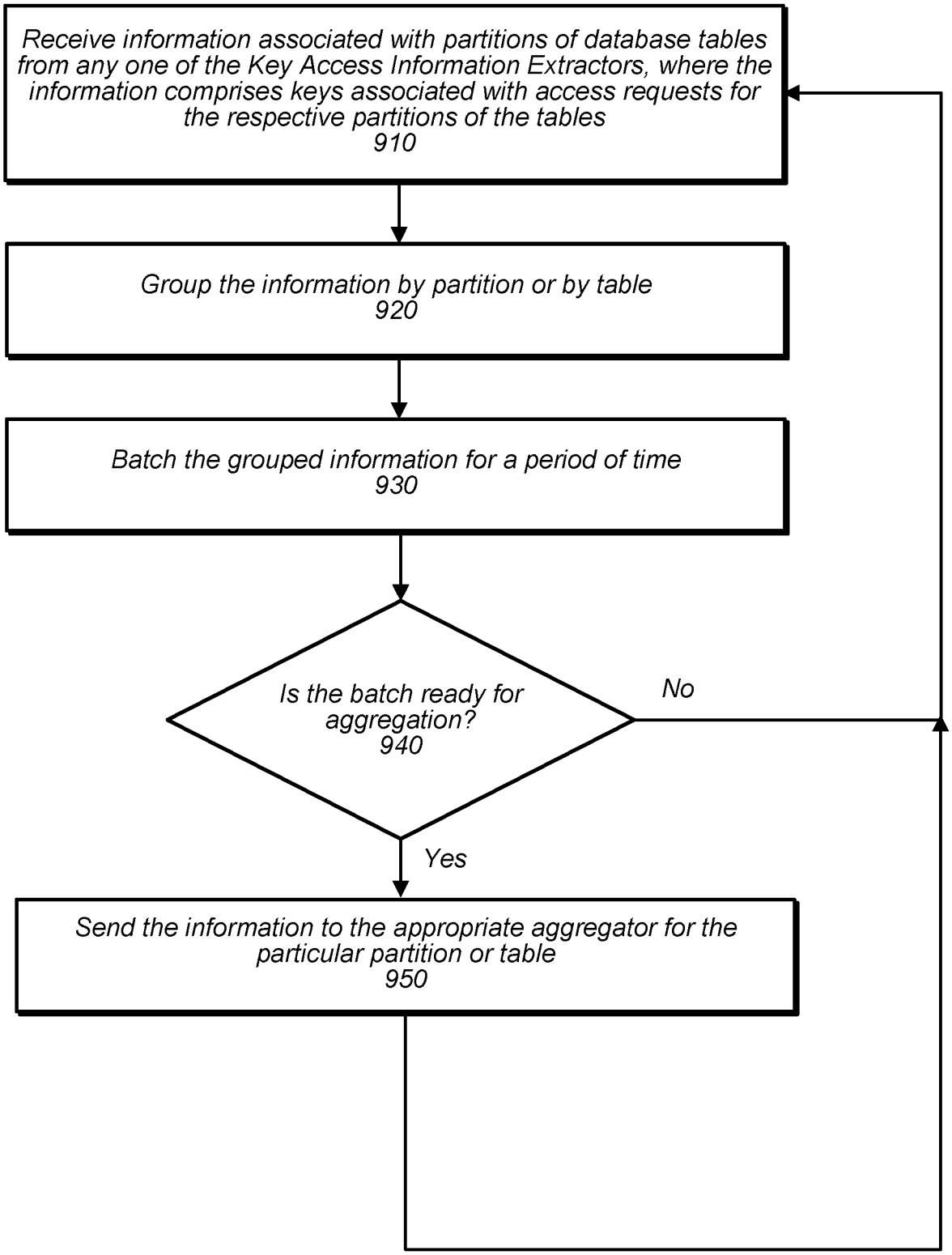
FIG. 9 is a flow diagram illustrating some of the operations of key tracker nodes of a key tracking service, according to some embodiments.

FIG. 9 is a flow diagram illustrating some of the operations of key tracker nodes of a key tracking service, according to some embodiments. At step 910 a key tracker node receives information associated with partitions of database tables from any one of the key access information extractors, where the information comprises keys associated with access requests for the respective partitions of the tables. Then at 920, the key tracker groups the information by partition or by table. Then at 930, the key tracker batches the grouped information for a period of time. The flow transitions to 940 where the key tracker determines whether the batch is ready for aggregation. If the batch is not ready for aggregation, the flow returns to 910. If the batch is ready for aggregation, the flow transitions to 950 where the key tracker send the information to the appropriate aggregator for the particular partition or table.

Figure 10:
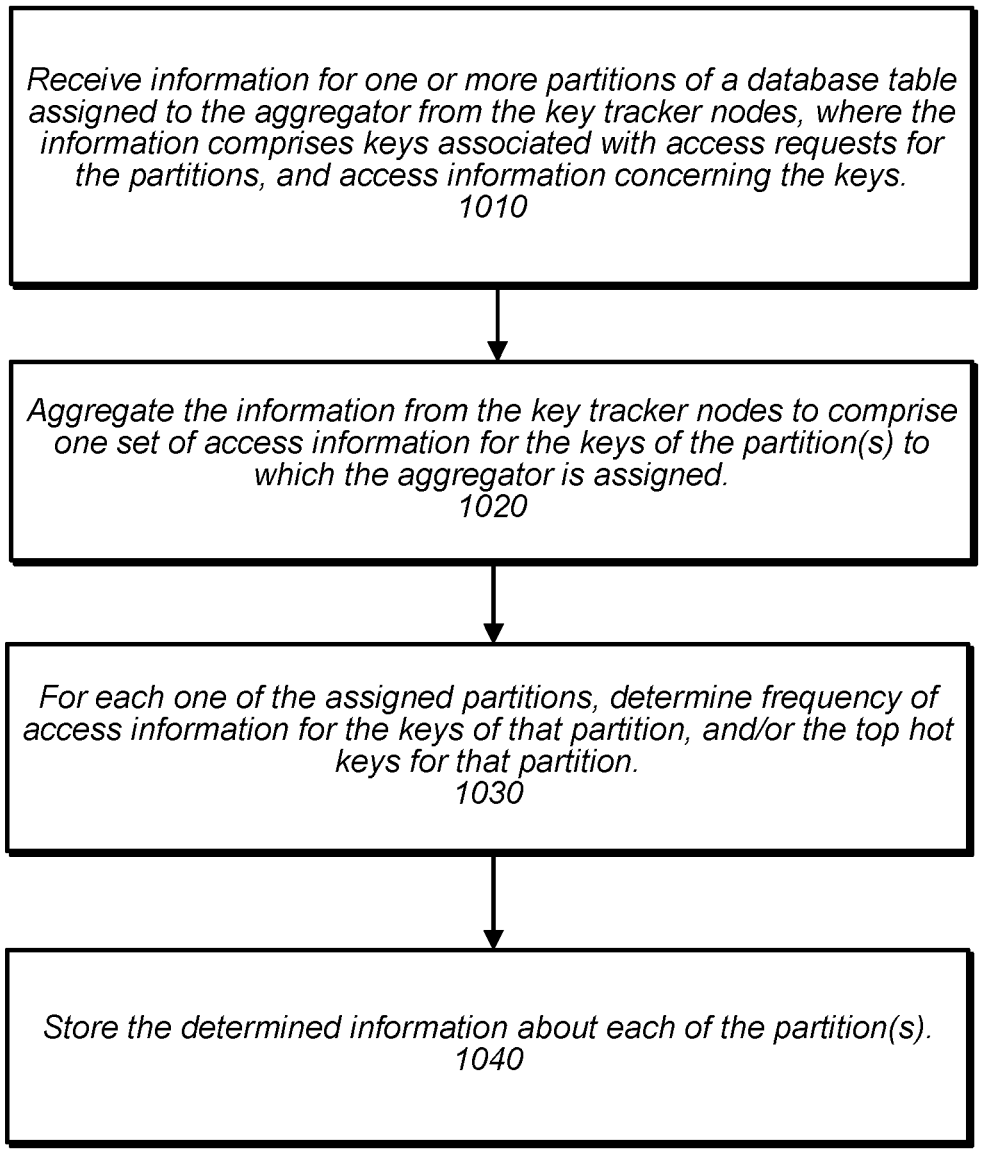
FIG. 10 is a flow diagram illustrating some of the operations of aggregator nodes of a key tracking service according to some embodiments.

FIG. 10 is a flow diagram illustrating some of the operations of aggregator nodes of a key tracking service according to some embodiments. At step 1010, an aggregator receives information for one or more partitions of a database table assigned to the aggregator from the key tracker nodes, where the information comprises keys associated with access requests for the partitions, and access information concerning the keys. Then, at 1020, the aggregator aggregate the information from the key tracker nodes to comprise one set of access information for the keys of the partition(s) to which the aggregator is assigned. Then, at step 1030, for each one of the assigned partitions, the aggregator determine frequency of access information for the keys of that partition, and/or the top hot keys for that partition. Finally, at step 1040 the aggregator stores the determined information about each of the partition(s).

Illustrative System

Figure 11:
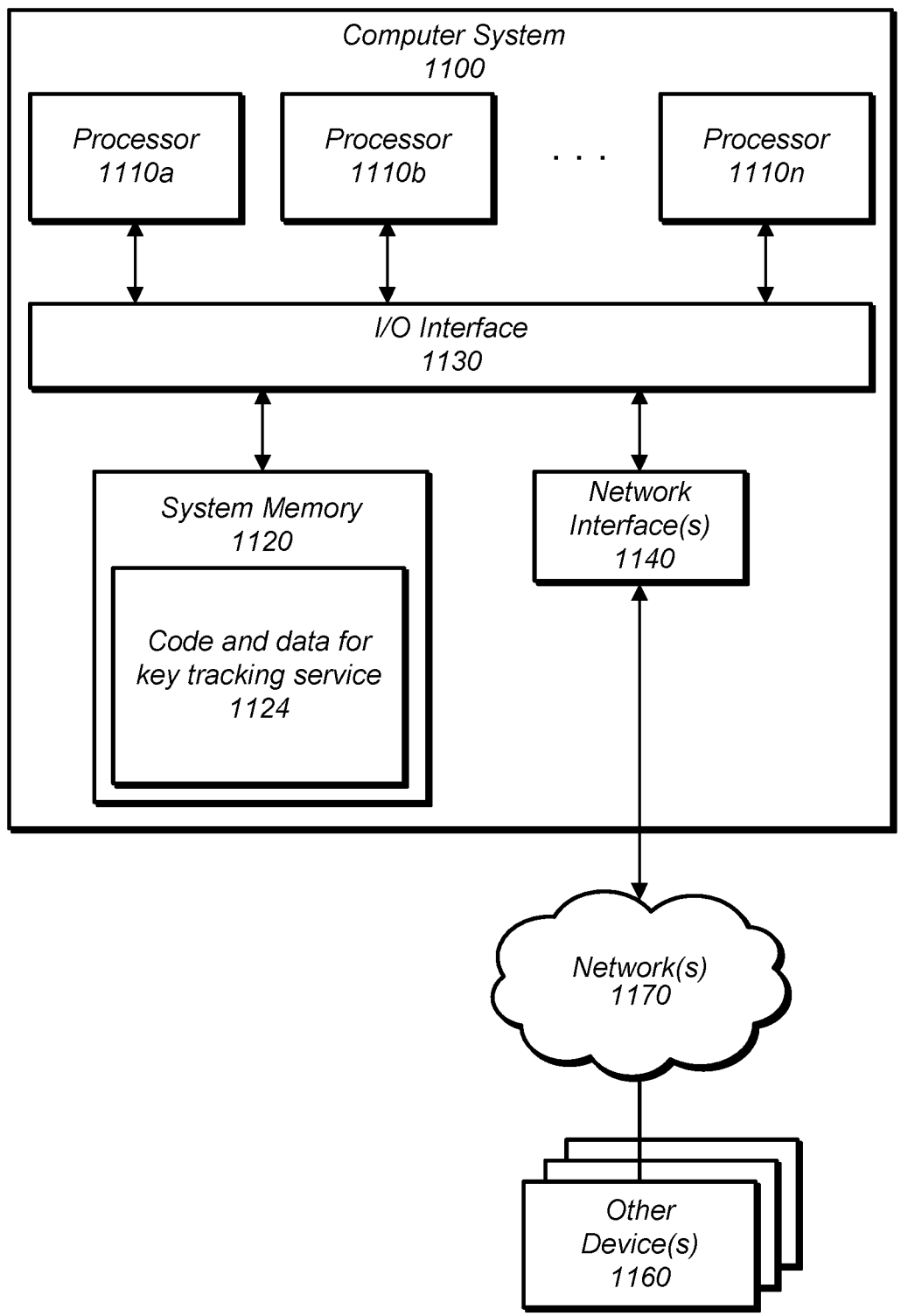
FIG. 11 is a block diagram illustrating an example computer system that may be used for implementation of the key tracking service, according to some embodiments.

FIG. 11 is a block diagram illustrating an example computer system that may be used for implementation of the key tracking service, according to some embodiments. In at least some embodiments, a computer that implements a portion or all of the apparatuses and methods the key tracking service as described herein may include a general-purpose computer system or computing device that includes or is configured to access one or more computer-accessible media, such as computer system 1100 illustrated in FIG. 11. FIG. 11 is a block diagram illustrating an example computer system that may be used for a key tracking service 140 in some embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for a distributed numeric sequence generator, are shown stored within system memory 1120 as the code and data for a key tracking service 1124.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1020) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1170, such as other computer systems or devices as illustrated in FIGS. 1, 2, 3, and 4, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above for FIGS. 1 through 10 for implementing the key tracking service. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

CONCLUSION

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A system, comprising:

a plurality of storage nodes of a database service that stores, via a storage layer, one or more database tables, wherein individual storage nodes receive, via APIs of the storage layer, access requests directed to database records within the one or more database tables and provide responses to the access requests via the APIs of the storage layer;

one or more computing devices, comprising one or more processors and associated memory, configured to implement a plurality of key access information extractors, wherein individual key access information extractors obtain key information from the responses to the access requests provided by the individual storage nodes, wherein the obtained key information identifies database records within the one or more database tables; and one or more computing devices, comprising one or more processors and associated memory, configured to implement a key tracking service remote from the storage layer of the database service and configured to:

receive information associated with one or more partitions of a database table of the one or more database tables from one or more of the key access information extractors, wherein individual partitions of the one or more partitions of the database table comprise database records, wherein individual database records of the individual partitions are identified by a key, of a plurality of keys, that is unique within the database table, and wherein the information comprises at least one or more keys of one or more accessed database records, the at least one or more keys obtained by the one or more key access information extractors from one or more of the responses to the access requests provided by the individual storage nodes;

based at least in part on the received one or more keys of the one or more accessed database records obtained by the one or more key access information extractors from the one or more of the responses to the access requests provided by the individual storage nodes, determine a frequency of access information for individual ones of the one or more keys of the one or more accessed database records of the respective partitions;

store the frequency of access information for the individual ones of the one or more keys of the one or more accessed database records of the respective partitions; and provide access to the frequency of access information for individual ones of the partitions.

2. The system of claim 1 wherein the key tracking service comprises a plurality of key trackers and one or more aggregators, wherein the receiving information associated with one or more partitions of the database table is performed by individual key trackers of the plurality of key trackers, wherein at least the determining the frequency of access information and the storing are performed by individual ones of the one or more aggregators, wherein each partition of the one or more partitions is assigned to a single aggregator, wherein individual key trackers of the plurality of key trackers are further configured to:
  send the information comprising the at least one or more keys associated with respective partitions of the one or more partitions to a respective aggregator of the one or more aggregators assigned to that respective partition; and
wherein individual aggregators of the one or more aggregators are further configured to:
  receive the information comprising at least one or more of the keys associated with one or more of the partitions assigned to the individual aggregator, from one or more of the plurality of key trackers.

3. The system of claim 1 wherein the key tracking service further comprises an application programming interface (API) to provide the frequency of access information to clients, and wherein the key tracking service is further configured to:
  receive a request via the API for one or more of the most frequently accessed keys of at least a particular partition of the database table;
  determine the one or more most frequently accessed keys of the particular partition from the frequency of access information; and
  provide the one or more most frequently accessed keys of the particular partition via the API.

4. The system of claim 1 wherein in response to receiving the information associated with the one or more partitions of the database table from the one or more of the key access information extractors, the key tracking service is further configured to:
  provide at least some of the frequency of access information for the individual ones of the one or more keys of the respective partitions to the respective key access information extractor; and
wherein the respective key access information extractor is further configured to:
  receive the at least some of the frequency of access information for the individual ones of the one or more keys of the respective partitions; and
  provide the at least some of the frequency of access information in individual responses to the access requests.

5. A method, comprising:
  tracking, outside a storage layer of a database service that stores database records and serves an API, key access patterns for a database service, comprising:
    receiving, by a key tracking service distinct from the storage layer of the database service and from one or more of a plurality of key access information extractors, information associated with one or more partitions of a database table, stored by the database service, wherein individual key access information extractors obtain key information from access request responses provided via storage nodes of the database service, wherein the access request responses are responsive to access requests directed to database records within the database table, wherein individual partitions of the one or more partitions of the database table comprise database records, wherein individual database records of the individual partitions are identified by a key, of a plurality of keys, that is unique within the database table, and wherein the information comprises at least one or more keys of one or more accessed database records, the at least one or more keys obtained by the one or more key access information extractors from one or more of the access request responses provided by the storage nodes;
    based at least in part on the received one or more keys of the one or more accessed database records obtained by the one or more key access information extractors from the one or more access request responses provided by the storage nodes, determining frequency of access information for individual ones of the one or more keys of the one or more accessed database records of respective partitions of the one or more partitions; and
    storing the frequency of access information for the individual ones of the one or more keys of the one or more accessed database records of the respective partitions; and
  providing access to the frequency of access information for individual ones of the partitions.

6. The method of claim 5 further comprising:
  sending, by individual key trackers of a plurality of key trackers, the information comprising the at least one or more keys associated with respective partitions of the one or more partitions to a respective aggregator of one or more aggregators assigned to that respective partition; and
  receiving, by individual aggregators of one or more aggregators, the information comprising at least one or more of the keys associated with one or more of the partitions assigned to the individual aggregator, from one or more of the plurality of key trackers.

7. The method of claim 6, wherein sending, by individual key trackers of a plurality of key trackers, the information comprising the at least one or more keys associated with the respective partitions of the one or more partitions to a respective aggregator of one or more aggregators assigned to that respective partition further comprises:
  batching, by the individual key trackers, the information comprising the at least one or more keys from the one or more key access information extractors; and
  sending, when the batched information is ready to be aggregated, the batched information comprising the at least one or more keys associated with the respective partitions of the one or more partitions to the respective aggregator of one or more aggregators assigned to that respective partition.

8. The method of claim 6, wherein the individual key access information extractors further obtain, from the access request responses provided by the storage nodes of the database service, frequency of access information for a partition of the one or more partitions associated with the respective access request response, the method further comprising:
  determining, by the individual key access information extractors, that the frequency of access information for the partition is greater than a threshold; and based on the determination, sending the information comprising the one or more keys associated with the partition to a key tracker of the plurality of key trackers.

9. The method of claim 5 further comprising:
receiving a request via an application programming interface (API) for one or more of the most frequently accessed keys of at least a particular partition of the database table;
determining the one or more most frequently accessed keys of the particular partition from the frequency of access information; and
providing the one or more most frequently accessed keys of the particular partition via the API.

10. The method of claim 5, further comprising:
providing, in response to receiving the information associated with the one or more partitions of the database table from the one or more of the key access information extractors, at least some of the frequency of access information to the one or more key access information extractors.

11. The method of claim 10, wherein access requests associated with the access request responses are initiated by a client, the method further comprising:
receiving, by individual key access information extractors, at least some of the frequency of access information for the individual ones of the one or more keys of the respective partitions; and
providing the at least some of the frequency of access information to the client as part of the access request response.

12. The method of claim 5, further comprising:
generating information for display of a graphical user interface (GUI) including a visualization that displays historical key access pattern metrics associated with the database table, the historical key access pattern metrics including metrics associated with the frequency of access information the individual ones of the one or more keys.

13. One or more non-transitory computer-readable storage media storing program instructions, that when executed on or across one or more processors of a key tracking service, cause the one or more processors to implement a key tracking service, distinct from a storage layer of a database service that stores database records and serves an API, the key tracking service to:
track, outside the storage layer of the database service, key access patterns for the database service, comprising:
receive information associated with one or more partitions of a database table, stored by the database service, from one or more of a plurality of key access information extractors, wherein individual key access information extractors obtain key information from access request responses provided via storage nodes of the database service, wherein the access request responses are responsive to access requests directed to database records within the database table, wherein individual partitions of the one or more partitions of the database table comprise database records, wherein individual database records of the individual partitions are identified by a key, of a plurality of keys, that is unique within the database table, and wherein the information comprises at least one or more keys of one or more accessed database records, the at least one or more keys obtained by the one or more key access information extractors from one or more of the access request responses provided by the storage nodes;
based at least in part on the received one or more keys of the one or more accessed database records obtained by the one or more key access information extractors from the one or more access request responses provided by the storage nodes, determine a frequency of access information for individual ones of the one or more keys of the one or more accessed database records of respective partitions of the one or more partitions; and
store the frequency of access information for the individual ones of the one or more keys of the one or more accessed database records of the respective partitions; and
provide access to the frequency of access information for individual ones of the partitions.

14. The one or more non-transitory computer-readable storage media of claim 13, wherein the key tracking service comprises a plurality of key trackers and one or more aggregators, wherein the program instructions cause individual key trackers of a plurality of key trackers to further perform:
send the information comprising the at least one or more keys associated with respective partitions of the one or more partitions to a respective aggregator of one or more aggregators assigned to that respective partition; and
wherein the program instructions cause individual aggregators of one or more aggregators to further perform:
receive the information comprising at least one or more of the keys associated with one or more of the partitions assigned to the individual aggregator, from one or more of the plurality of key trackers.

15. The one or more non-transitory computer-readable storage media of claim 14, wherein in sending, by individual key trackers of a plurality of key trackers, the information comprising the at least one or more keys associated with the respective partitions of the one or more partitions to a respective aggregator of one or more aggregators assigned to that respective partition, the program instructions cause the individual key trackers to further perform:
batch the information comprising the at least one or more keys from the one or more key access information extractors; and
send, when the batched information is ready to be aggregated, the batched information comprising the at least one or more keys associated with the respective partitions of the one or more partitions to the respective aggregator of one or more aggregators assigned to that respective partition.

16. The one or more non-transitory computer-readable storage media of claim 14, wherein the individual key access information extractors further obtain, from the access request responses provided by the storage nodes of the database service, frequency of access information for a partition of the one or more partitions associated with the respective access request response, wherein the program instructions cause the individual key access information extractors to further perform:
determine that the frequency of access information for the partition is greater than a threshold; and
based on the determination, send the information comprising the one or more keys associated with the partition to a key tracker of the plurality of key trackers.

17. The one or more non-transitory computer-readable storage media of claim 13, wherein the program instructions cause the one or more processors of the key tracking service to further perform:
- receive a request via an application programming interface (API) for one or more of the most frequently accessed keys of at least a particular partition of the database table;
- determine the one or more most frequently accessed keys of the particular partition from the frequency of access information; and
- provide the one or more most frequently accessed keys of the particular partition via the API.

18. The one or more non-transitory computer-readable storage media of claim 13, wherein the program instructions cause the one or more processors of the key tracking service to further perform:
- provide, in response to receiving the information associated with the one or more partitions of the database table from the one or more of the key access information extractors, at least some of the frequency of access information to the one or more key access information extractors.

19. The one or more non-transitory computer-readable storage media of claim 13, wherein access requests associated with the access request responses are initiated by a client, and wherein the program instructions cause the individual key access information extractors to perform:
- receive at least some of the frequency of access information for the individual ones of the one or more keys of the respective partitions; and
- provide the at least some of the frequency of access information to the client as part of the access request response.

20. The one or more non-transitory computer-readable storage media of claim 13, wherein the program instructions cause the one or more processors of the key tracking service to further perform:
- generate information for display of a graphical user interface (GUI) including a visualization that displays historical key access pattern metrics associated with the database table, the historical key access pattern metrics including metrics associated with the frequency of access information the individual ones of the one or more keys.

* * * * *